July 14, 1942.  R. H. BARNARD ET AL  2,290,012
APPARATUS FOR MANUFACTURING HOLLOW GLASS ARTICLES
Filed June 24, 1939  8 Sheets-Sheet 7
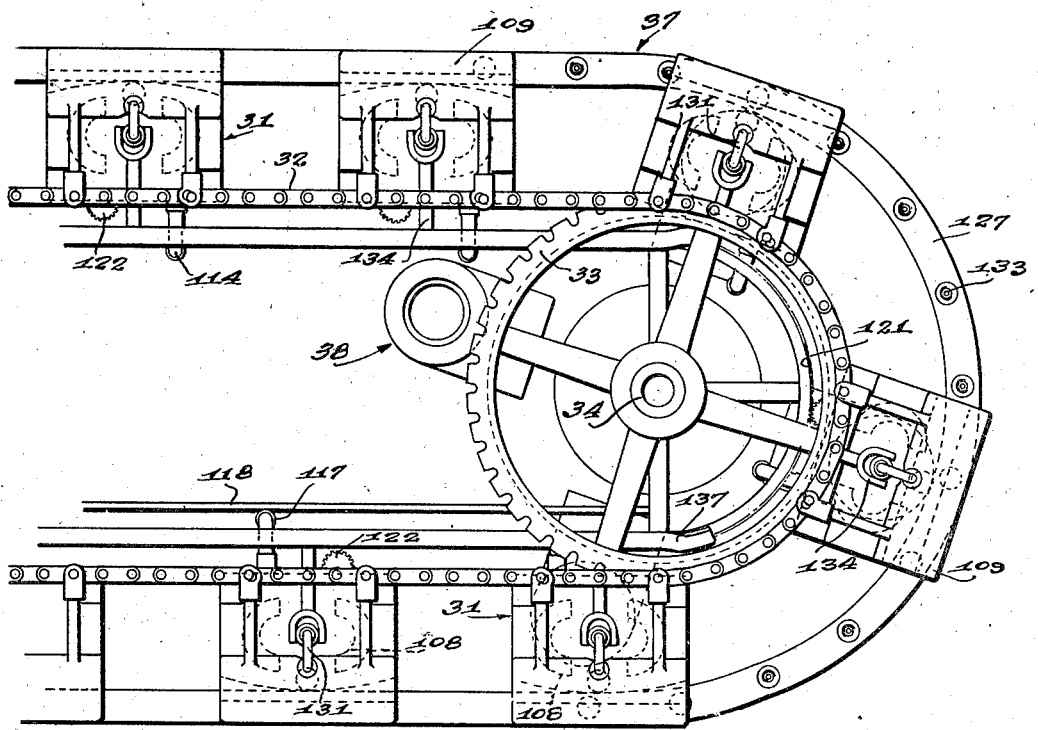
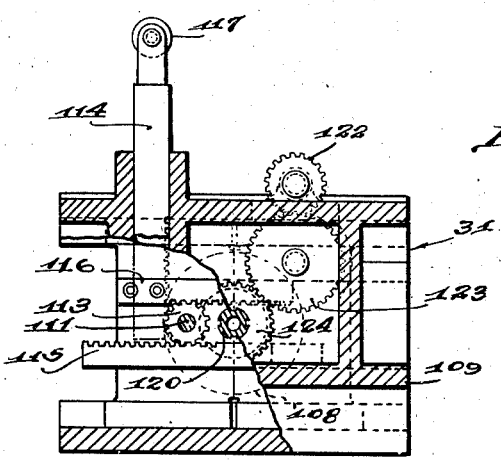
R.H.Barnard
F.T.Nesbitt
J.P.Benoit
C.W.Schreiber
J.E.McLaughlin
INVENTORS
BY Rule & Hoge,
ATTORNEYS.

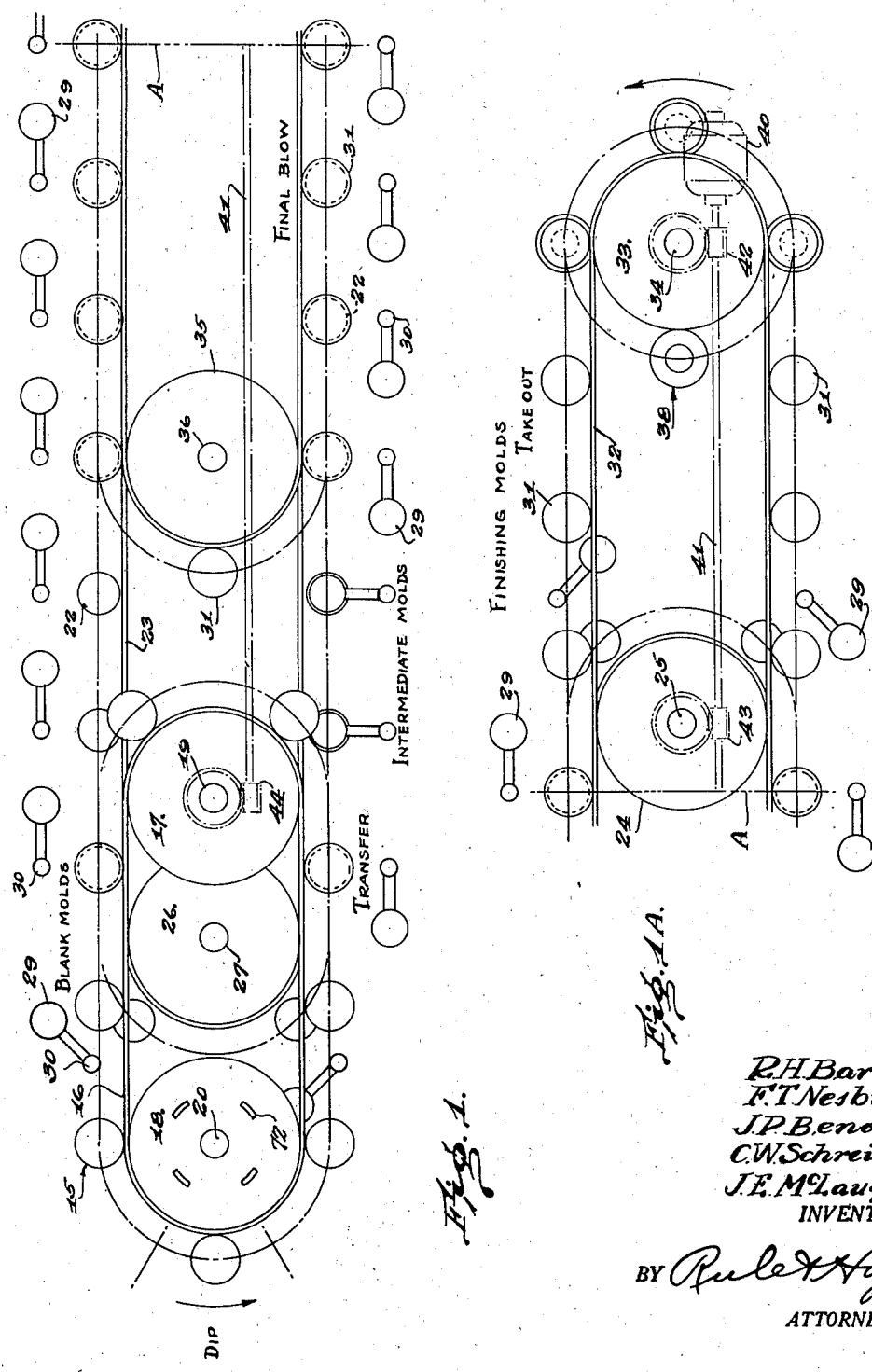

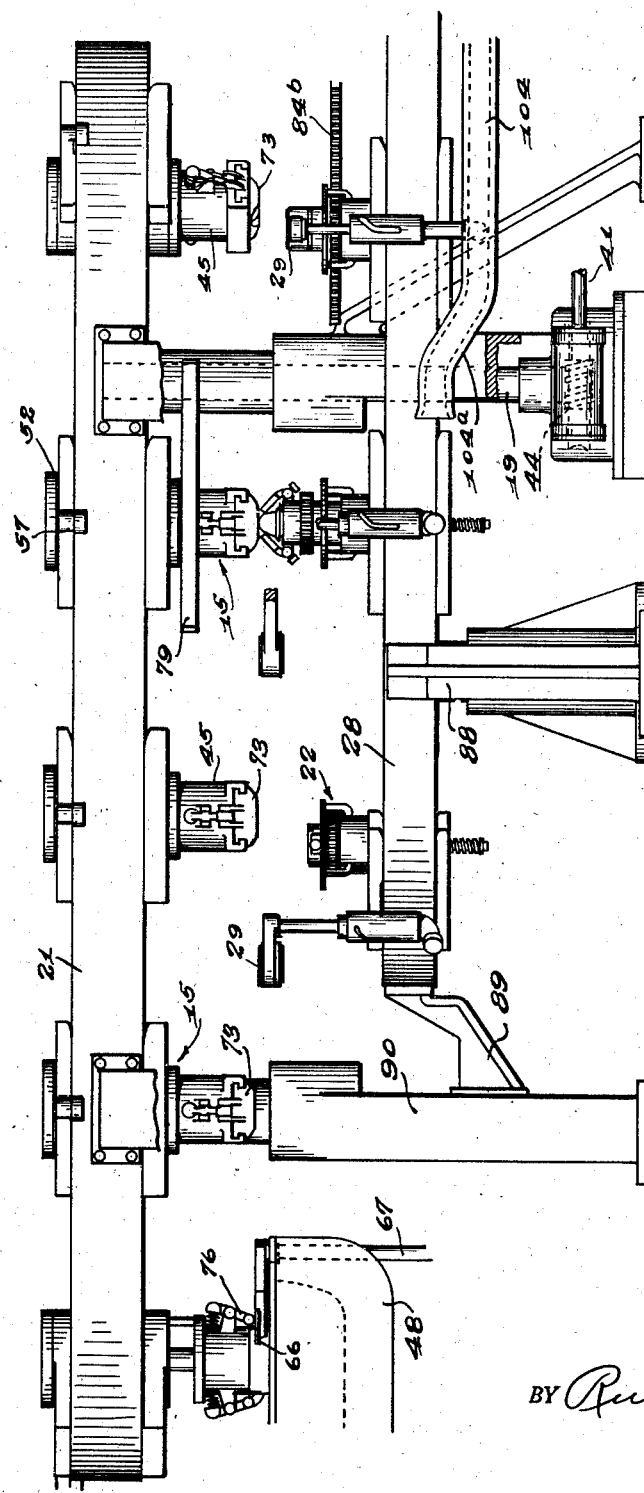

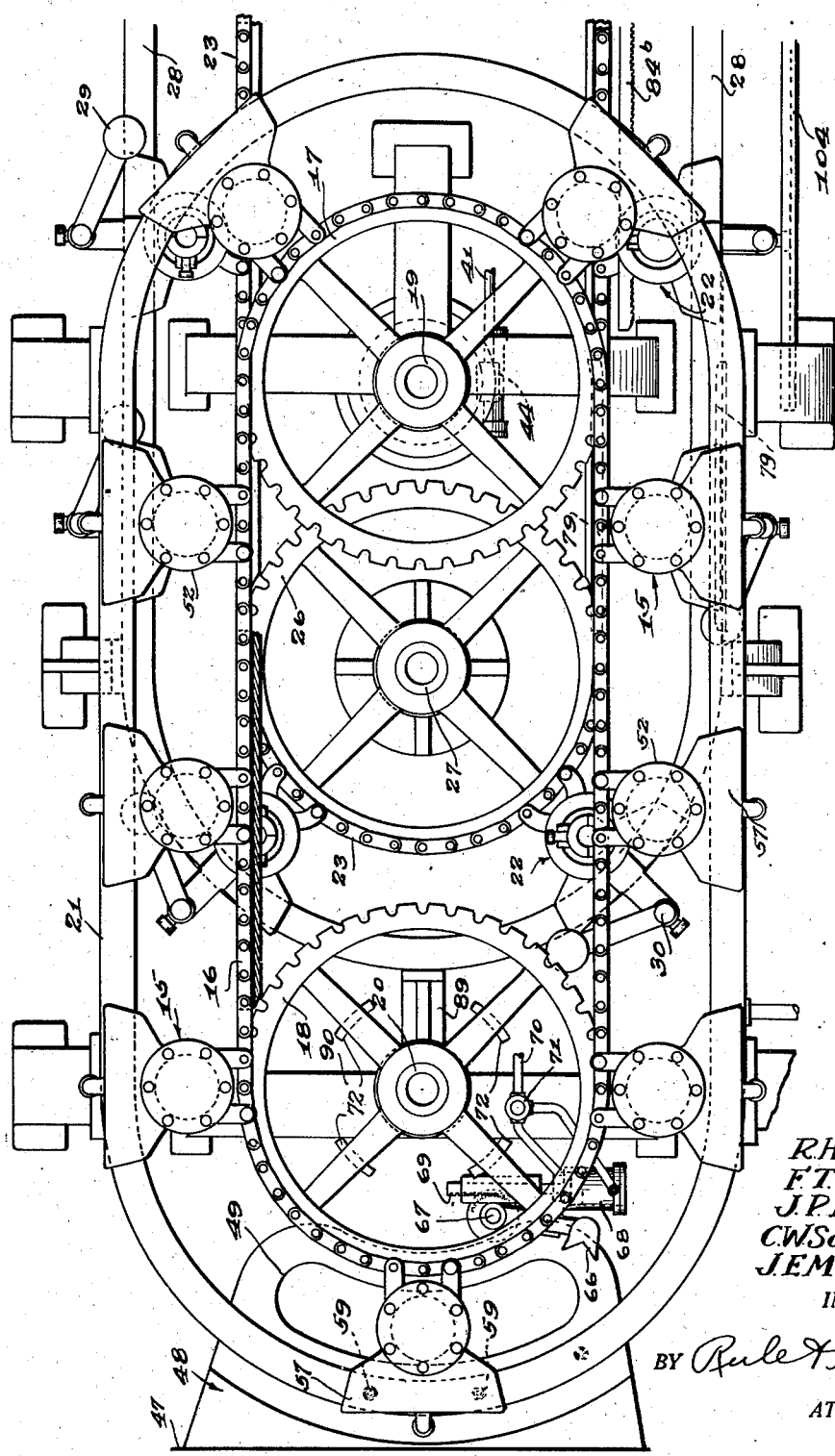

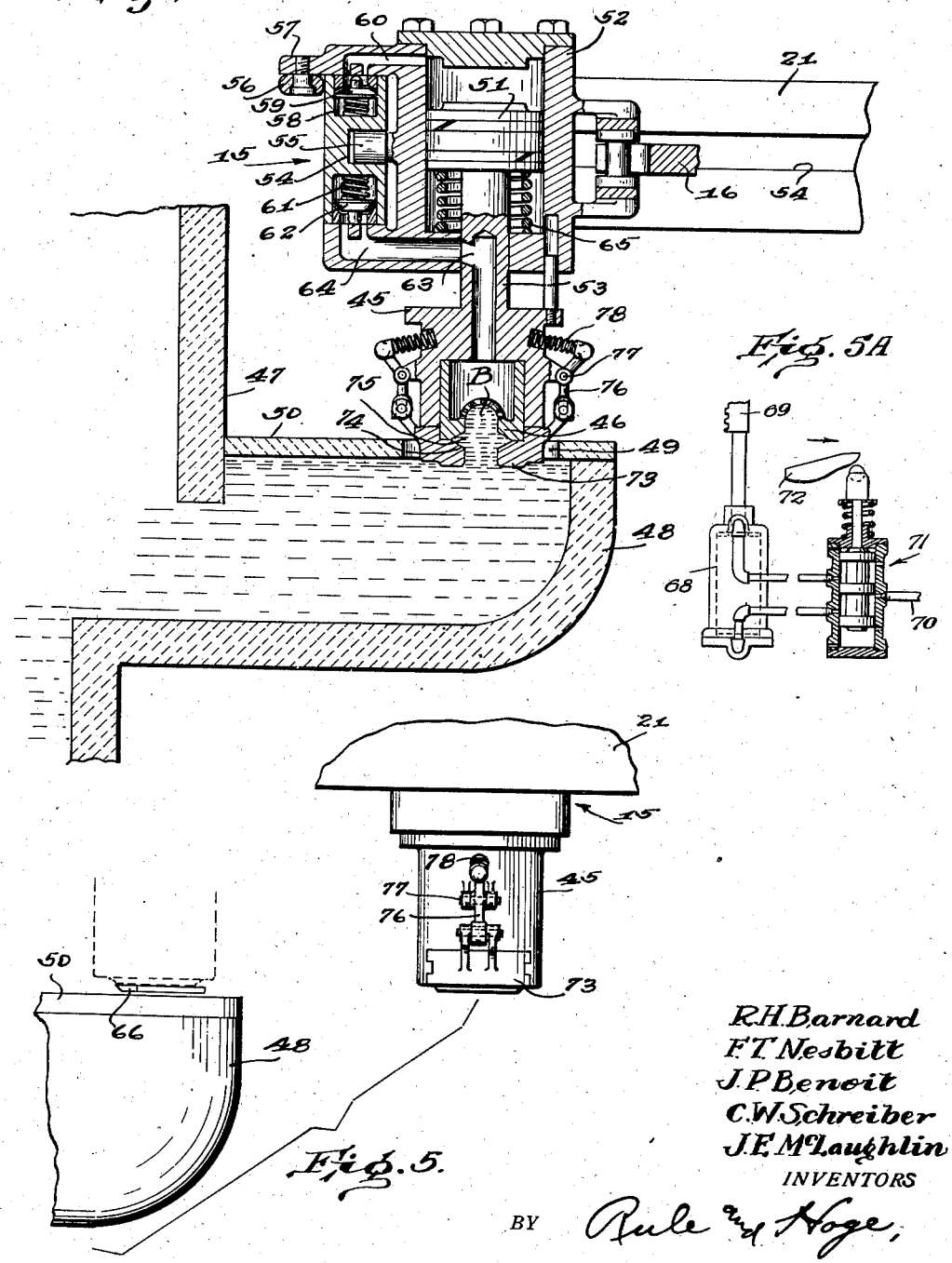

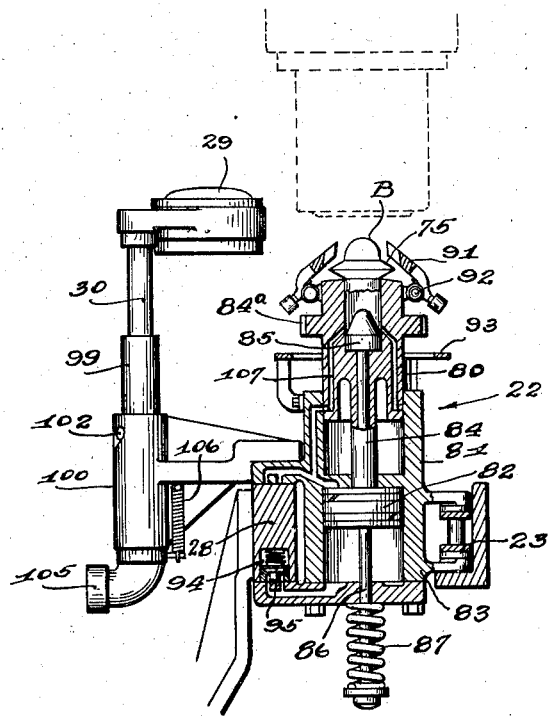
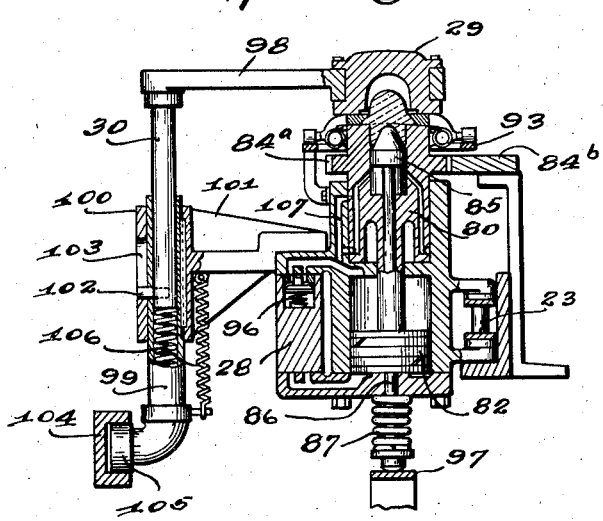

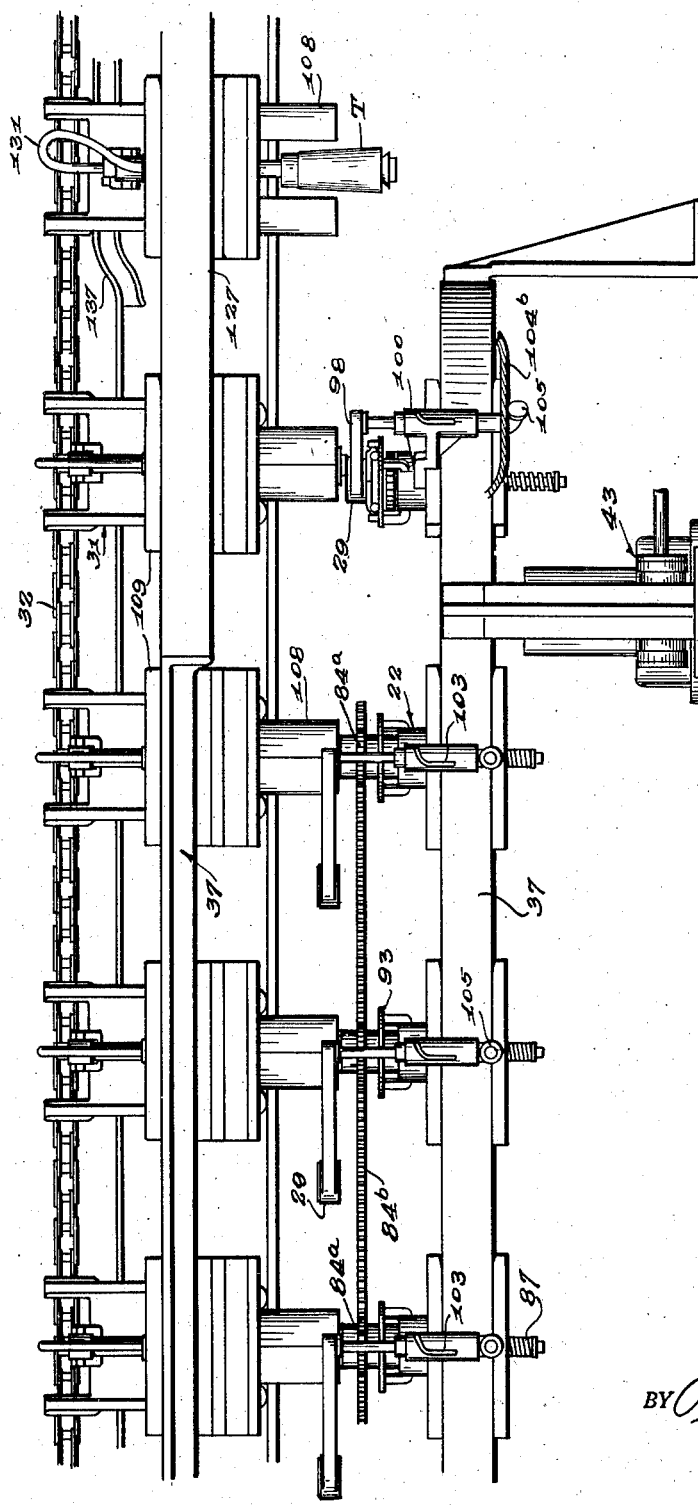

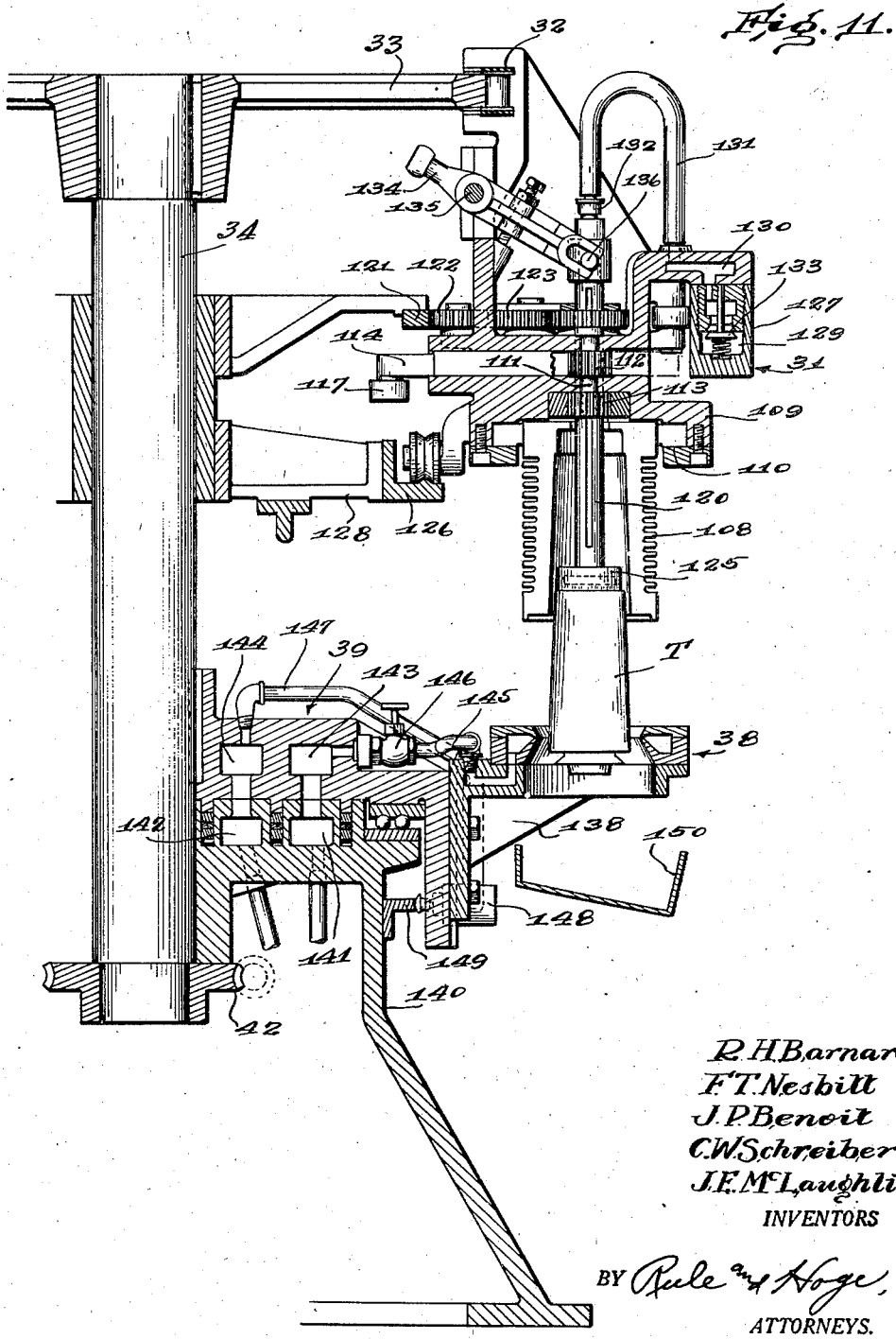

Patented July 14, 1942

2,290,012

UNITED STATES PATENT OFFICE 2,290,012

APPARATUS FOR MANUFACTURING HOLLOW GLASS ARTICLES

Randolph H. Barnard, Frank T. Nesbitt, and Carl W. Schreiber, Toledo, Ohio, and Joseph P. Benoit and John E. McLaughlin, Alton, Ill., assignors to Owens-Illinois Glass Company, a corporation of Ohio Application June 24, 1939, Serial No. 281,006

19 Claims. (Cl. 49—5)

Our invention relates to apparatus for molding hollow glass articles and particularly to a type of apparatus in which a series of suction gathering molds are brought in succession to a gathering position over a pool of molten glass to gather charges of glass by suction, the charges being thereafter blown to the form of finished articles such, for example, as tumblers.

An object of the invention is to provide a machine of simple construction as compared with conventional machines, and having a large output. To this end the invention comprises a chain type of apparatus in which a series of gathering units, each including a suction gathering mold, is attached to an endless chain conveyor and the molds brought thereby in succession to a charge-gathering position at which the charges of glass are drawn by suction into the molds. The mold charges or blanks are transferred from the molds to spindles also carried on an endless conveyor. The blanks which are carried on the spindles may be partially developed in intermediate molds traveling with the spindles. Thereafter, the blanks are transferred to finishing molds which may also be carried on an endless conveyor and in which the articles are blown to their final form.

A further feature of the invention relates to a novel form of burn-off mechanism by which the moil is removed from the blown articles.

A further object of the invention is to provide an apparatus of the character above indicated wherein the operations of developing the blanks and completing the articles are effected without the need of inverting the blank at any time.

Other objects of the invention will appear hereinafter.

Referring to the accompanying drawings which illustrate a preferred form of the invention:

Figs. 1 and 1A together form a diagrammatic plan view of the apparatus, said figures showing the apparatus at the left and right respectively of the section line A.

Fig. 2 is a fragmentary elevation showing the series of gathering heads and also showing thereabeneath some of the cooperating spindles;

Fig. 3 is a plan view of the mechanism shown in Fig. 2;

Fig. 4 is a sectional elevation showing a gathering unit with the mold in dip;

Fig. 5 is a fragmentary side elevation showing a gathering unit and a portion of the furnace forebay;

Fig. 5A is a detail view showing the knife operating motor and its control valve, the motor being shown for the sake of clarity turned ninety degrees from its normal position with reference to the control valve 71, the normal position being shown in Fig. 3;

Fig. 6 is a sectional elevation of a spindle unit and cooperating mold, the parts being in the position assumed at the time a blank is dropped onto the spindle;

Fig. 7 is a similar view but with the parts in the position assumed when the mold has been brought to position over the blank;

Fig. 8 is a fragmentary elevation showing an intermediate portion of the finishing mold group and the portion of the spindle group thereebeneath;

Fig. 9 is a plan view of the right-hand end portion of the finishing mold group and also showing the burn-off mechanism;

Fig. 10 is a part sectional horizontal view of a finishing mold, mechanism for opening and closing the mold, and means for rotating the cooperating spindle; and Fig. 11 is a fragmentary elevation view illustrating a finishing mold unit and a cooperating burn-off unit.

GENERAL CONSTRUCTION AND ARRANGEMENT

Referring particularly to Figs. 1 and 1A, the general arrangement of parts is as follows:

The gathering mold group comprises gathering mold units 15, one of which is shown in detail in Fig. 4, said units connected to an endless sprocket chain 16 (see Fig. 3) trained over a driving sprocket wheel 17 and a driven sprocket wheel 18 mounted respectively on a drive shaft 19 and a driven shaft 20. The mold units 15 are supported and guided during their travel by a guide rail 21 spaced outwardly from the sprocket chain 16.

Cooperating with the gathering mold group is a spindle group comprising spindle units 22, shown in detail in Figs. 6 and 7, connected to a spindle driving chain 23 trained over a driving sprocket 24 mounted on a drive shaft 25 and a driven sprocket 26 on a driven shaft 27. The spindle units 22 are supported on a rail 28 spaced outwardly from the chain 23. The spindle group is at a lower level than the gathering mold group. The left-hand portion of the spindle group extends underneath the gathering mold group and the spindles are arranged to register with the gathering molds during a portion of their travel to permit the transfer of the blanks to the spindles. Associated with each spindle and traveling therewith is an intermediate mold 29 mounted on a rock shaft 30 to swing over the spindle and then move downward to enclose a blank as hereinafter described.

The finishing mold group includes a series of finishing mold units 31 (see Figs. 9, 10, 11) connected to travel with an endless chain 32 trained over a drive sprocket wheel 33 on a driving shaft 34 and a sprocket 35 on a driven shaft 36. The finishing mold units 31 are supported and guided on a rail 37 spaced outwardly from the chain 32. The finishing mold group is arranged at a somewhat lower level than the gathering mold group as required to permit the spindles to raise the parisons into the finishing molds.

The spindles are carried beneath the finishing molds during a portion of their travel. After a blank has been blown in an intermediate mold 29, the latter is withdrawn and the spindle with the partially blown blank thereon is brought beneath a finishing mold and enclosed therein while still attached to the spindle. The blank is then blown to final form in the finishing mold and the latter then opened. The burn-off group includes a series of burners 38 (Figs. 9 and 11) on a carriage 39 mounted on the drive shaft 34 for rotation therewith, said carriage being positioned beneath the finishing mold group.

The drive shafts 34, 25 and 19 are all driven continuously and at the same speed. The driving means as shown (Fig. 1A) includes an electric motor 40, the shaft 41 of which has driving connection through a worm gear 42 with the shaft 34. Worm gearing in like manner provides driving connection between the shaft 41 and shaft 25. Similar gearing 44 is provided between the shaft 41 and the shaft 19.

Gathering unit

Referring to Figs. 2 to 5, each gathering mold unit 15 comprises a head 45 in which is mounted a suction gathering mold 46. Molten glass is supplied from a furnace 47 provided with a forebay 48. The gathering units travel continuously in a horizontal path and are brought in succession over the forebay. Each gathering head 45 as it moves over the forebay is lowered through an opening 49 in the cover plate 50. The mold thus contacts the pool of molten glass and suction is applied to draw a charge of glass into the mold.

The gathering head is lifted and lowered by means of a piston motor comprising a piston 51, cylinder 52, and piston rod 53. The stationary guide rail 21 is formed along its inner face with a recess 54 providing a track on which runs a roll 55 carried on the motor cylinder, thus supporting and guiding the gathering unit. A roll 56 mounted on a plate 57 which forms an extension of the motor cylinder, engages the outer surface of the rail 21 and assists in guiding the gathering unit and holding it in upright position.

Air under pressure for actuating the piston motor is supplied through a channel 58 extending lengthwise within the upper portion of the guide rail 21. Valves 59 mounted in the channel 58 control port openings in the upper face of the rail 21. As the plate 57 travels over the valves, the latter are opened, thereby permitting air under pressure from the channel through a passageway 60 to the upper end of the motor cylinder, so that the piston is lowered and moves the mold downward into dip. A vacuum or suction channel 61 within the lower portion of the guide rail 21, has mounted therein a suction valve 62 which is opened in the same manner as the valve 59 while the gathering unit is traveling through the gathering zone. When the mold is lowered into dip a port opening 63 in the piston rod 53 is brought into register with a passageway 64 leading from the channel 61, thereby establishing a suction line through which the air is exhausted from the mold, causing a charge of glass to be drawn into the mold. After the mold is filled, the air pressure valve 59 closes, cutting off the air pressure from the motor and permitting the gathering head to be lifted by means of a coil spring 65 to clear the cover plate 50. At the same time the piston rod 53 closes the channel 64. The rail 21 does not seal the passageway 60 after the latter passes beyond the valve opening but permits the motor cylinder to be vented through said passageway as the piston 51 rises.

A knife 66 (Figs. 2 and 3) is now swung across the bottom surface of the mold to sever the charge of glass from the supply body in the pool. The knife is carried on a rock arm mounted on a rock shaft 67 which is rotated by means of a piston motor 68 (Figs. 3 and 5A). The piston motor has rack and pinion driving connection 69 with the knife shaft. Air for operating the motor 68 is supplied through a pipe 70, the air supply being controlled by a valve 71 actuated by cams 72 mounted to rotate with the gear wheel 18 and spaced at angular distances corresponding to the spacing of the molds as they travel around the wheel 18.

The valve 71, which may be of conventional construction, comprises a valve stem which is lowered by each cam 72 as the cam passes over the valve stem, thereby connecting the air pressure pipe 70 with the inner end of the motor cylinder 68. This causes the motor to swing the knife 66 and sever the glass. As the valve passes beyond the cam 72, the valve stem is lifted by a spring and thereby reverses the valve. This supplies pressure to the outer end of the motor cylinder so that the motor is reversed and withdraws the knife. The valve 71 vents each end of the motor cylinder to the atmosphere when the other end is connected to the pressure pipe 70.

The blank B is temporarily held within the mold after the severing operation, by a pair of jaws 73 which are shaped to form with the lower surface of the mold, an annular recess 74 by means of which a shoulder 75 is formed on the blank. The jaws 73 are mounted to slide horizontally in the head 45 for releasing the blank and are actuated by means of levers 76 pivoted at 77 to the head 45. Coil springs 78 held under compression serve to hold the jaws in the Fig. 4 position until actuated by cams 79 (Figs. 2 and 3) to release the blank as hereinafter described.

Spindle unit

The spindle unit 22 will now be described. Referring to Figs. 6 and 7, such unit comprises a spindle 80 mounted to reciprocate vertically in a casing 81. The spindle is periodically lifted and lowered by a piston motor comprising a piston 82, piston rod 84, and a cylinder 83 forming an integral part of the casing 81. The spindle is rotated as hereinafter described, by a gear 84ᵃ thereon engaging a stationary rack bar 84ᵇ. A plunger 85 for forming an initial blow opening in the blank B is carried at the upper end of a vertical plunger rod 86 which extends downwardly through the piston rod and piston and below the motor casing. A coil spring 87 mounted on the rod is held under compression and normally holds the plunger in its retracted position. The spindle unit is, as before noted, supported and guided on a stationary rail 28. Said rail is mounted on standards 88 (Fig. 2). A bracket 89 (Figs. 2 and 3) forms a support for the left-hand end of the rail 28, said bracket being mounted on an end frame 90 in which the shaft 20 is journalled.

The spindle 80 carries a pair of jaws 91 pivoted thereto at 92. When a blank B has been dropped onto the spindle and the latter lowered, the jaws 91 are actuated by a ring 93 mounted on the casing 81, thereby swinging the jaws into position to grip the blank (Fig. 7).

Transfer of blank to spindle

When the gathering mold with a blank therein has been brought to the transfer position (Fig. 2), the jaws 73 of the blank mold are withdrawn by the cams 79, permitting the blank B to drop onto the spindle 80 (Fig. 6) which is now directly beneath the blank mold. The spindle at this time is in its upwardly projected position to which it has been brought by supplying air pressure beneath the piston 82. Air under pressure for this purpose is supplied from a pressure chamber or channel 94 within the rail 28, the air supply being controlled by a valve 95 within said channel. After the blank has been transferred to the spindle the air supply beneath the piston is cut off and air under pressure is supplied above the piston 82 from a pressure channel 96 (Fig. 7) formed in the upper part of the rail 28, thereby lowering the spindle. When the spindle is thus lowered, the jaws 91 grip the blank as before pointed out. The plunger 85 is at this time projected to form the initial blow opening in the blank. This projection of the plunger is under the control of a cam track 97. After the blow opening is formed, the plunger stem 86 passes beyond the cam track and the coil spring 87 withdraws the plunger.

Intermediate mold

As heretofore noted, an intermediate mold 29 (Figs. 2, 6, 7) is associated with each spindle. The mold is carried at the outer end of a rock arm 98 fixed to the rock shaft 30, the latter mounted to rock in a tubular shaft 99 which is in turn mounted for up and down movement but held against rotative movement, in a sleeve bearing 100 formed on a bracket 101 attached to the casing 81. The rocking movement of the shaft is controlled by a pin 102 secured to the rock shaft and extending into a cam slot 103 formed in the bearing sleeve 100. The pin 102 extends through a horizontal slot in the tubular shaft 99, thus permitting the rock shaft to rotate without any rotative movement of the shaft 99, but connecting the latter for up and down movement with the rock shaft 30. The cam slot includes an upper inclined portion which operates to swing the mold inward to a position over and in alignment with the spindle during the initial downward movement of the rock shaft. The lower portion of the slot 103 is vertical so that the mold is carried vertically downward to seat on the upper end of the spindle (Fig. 7) and enclose the blank. The downward movement of the rock shaft and mold is effected by a cam track 104 (Figs. 7 and 2) in the path of a cam roll 105 on the lower end of the shaft 99. The cam track includes a downwardly inclined section 104ª by which the mold is moved downward, and a horizontal section by which the mold is held seated during the blowing of the blank therein. The mold is lifted and swung outward by a coil spring 106 when the rock shaft passes beyond the cam 104. A cam 104ᵇ (Fig. 8) serves to draw the mold 29 down far enough to clear the finishing molds while passing around the gear 24.

Air under pressure for blowing the blank in the mold 29 is supplied from the pressure chamber 96 which communicates through a passageway 107 with the initial blow opening in the blank after the plunger 85 has been withdrawn.

Finishing mold unit

After the blank has been blown in the intermediate mold 29 and the latter withdrawn, the spindle carrying the blank is brought beneath and in register with one of the finishing mold units 31. The spindle is then moved upward and the blank enclosed in the finishing mold for the final blowing operation. The finishing mold and its operating mechanism will be understood by reference to Figs. 9, 10 and 11. Each unit 31 includes a finishing mold 108 comprising partible sections movable horizontally to and from each other for closing and opening the mold. The mold is supported on and depends from a head or frame 109 formed with guideways 110 to receive lugs on the mold sections for supporting and guiding the latter in the opening and closing movements of the mold. Journalled in the frame 109 is a shaft 111 carrying pinions 112 and 113. A rack bar 114 mounted to reciprocate lengthwise in the frame 109 engages the pinion 112 for rotating the latter and with it the pinion 113. Rack bars 115 and 116 which engage the pinion 113, are connected respectively to the two sections in the mold. The rack bar 114 carries a cam roll 117 which runs on a stationary cam track 118 shaped and positioned for effecting the required movements of the rack bar 114 for opening and closing the finishing mold at the desired points during the travel of the latter.

The blanks may be rotated in the finishing molds where the latter consist of paste molds. The means for rotating the blanks in the finishing molds includes a shaft 120 (Figs. 10 and 11) which is concentric with the mold and is movable up and down therein. The shaft is rotated by means of a stationary rack bar 121 which operates through a gear train including a pinion 122 which runs on the rack bar, an intermediate gear 123, and a gear 124 splined on the shaft 120. The blank is attached to the shaft 120 for rotation therewith by means of a suction head 125 on the lower end of the shaft, suction being applied to said head through the shaft which is made hollow for this purpose.

The finishing mold unit 31 is supported during its travel on inner and outer rails 126 and 127 respectively. The inner rail as shown is supported on brackets 128. The outer rail 127 is formed with a vacuum chamber 129 which is in communication with a vacuum chamber 130 in the finishing mold head during predetermined portions of the travel of the mold. A flexible hose 131 provides communication between the chamber 130 and the hollow shaft 120, the hose having a swivel connection 132 with said shaft, permitting the latter to rotate. The application of suction to the head 125 is controlled by a valve 133 mounted in the rail 127.

Burn-off mechanism

After the article (herein shown as a tumbler

T) has been blown in the finishing mold, the latter is opened and the blown article while held by the suction head or chuck 125, is lowered as shown in Fig. 11, permitting the moil to be burned off by the burners 38. The lowering of the blown article is controlled by a cam operated lever 134 pivoted at 135 on the frame 109. The lever has a forked end which engages a pin 136 carried on the shaft 120. The opposite end of the lever is provided with a cam roll to run on a cam 137 (see Fig. 8) shaped to actuate said lever and lower the blown article.

The burners 38 may be of conventional construction, each formed to direct an annular flame against the article. The burners are carried on brackets 138 attached to the burner carriage 39 which is mounted for rotation on the standard 140, the carriage being keyed to the drive shaft 34. Fuel gas and oxygen are supplied respectively from annular chambers 141 and 142 formed in the machine base 140. Chambers 143 and 144 provided in the carriage 39 communicate respectively with the chambers 141 and 142 during predetermined portions of their rotation with the burner carriage. It will be understood that the chambers 143 and 144 are individual to the burners 38. A pipe 145 extends from the chamber 143 to the burner for supplying the fuel gas. A hand valve 146 in this pipe line permits the gas to be shut off manually whenever required. A pipe line 147 leading from the oxygen chamber 144 to the burner, has therein an automatic valve 148 adapted to be actuated by a stationary cam 149 mounted on the machine base. Said cam holds the valve open during the required intervals for burning off the moil. It will be noted that during the burning operation the blown article is rotated. The moil when burned off drops into a receptacle or chute 150.

The article T is held by the chuck 125 until it has passed beyond the burner mechanism and may then be discharged by releasing the vacuum in the chuck.

Modifications may be resorted to within the spirit and scope of our invention.

We claim:

1. Apparatus for producing molded glass articles, comprising a chain type endless conveyor, driving and driven elements rotatable about horizontally spaced vertical axes and over which the conveyor is trained, a series of blank molds arranged at intervals along the conveyor and connected to travel therewith, a container for a pool of molten glass, the path of said molds extending over the pool, motors individual to the molds and operatively connected thereto for dipping the molds into the pool, and means for drawing charges of glass from the pool into the molds.

2. Apparatus for producing molded glass articles, comprising an endless chain conveyor, gears rotatable about parallel axes and over which the conveyor is trained for causing it to travel in a closed path, blank mold units arranged at intervals along the conveyor and connected to travel therewith, each said unit comprising a dip head, a mold thereon, and a piston motor operable to lower and lift the dip head at a charging station, and means to introduce charges of molten glass into the molds when lowered.

3. Apparatus for producing molded glass articles, comprising a vertical drive shaft, a vertical driven shaft horizontally spaced therefrom, a driving element and a driven element mounted on said shafts respectively, an endless conveyor trained over said elements, a series of molds connected to said conveyor at spaced intervals therealong, and a stationary supporting and guiding rail surrounding said conveyor and horizontally spaced therefrom and in substantial parallelism with the conveyor at all points lengthwise of the conveyor, said mold units being supported and guided by said rail as they travel with the conveyor.

4. Apparatus for producing molded glass articles, comprising a vertical drive shaft, a vertical driven shaft horizontally spaced therefrom, a driving element and a driven element mounted on said shafts respectively, an endless conveyor trained over said elements, a series of molds connected to said conveyor at spaced intervals therealong, a stationary supporting and guiding rail surrounding said conveyor and horizontally spaced therefrom and in substantial parallelism with the conveyor at all points lengthwise of the conveyor, said mold units being supported and guided by said rail as they travel with the conveyor, air motors individual to the molds and operatively connected thereto, said rail formed with an air pressure channel extending therealong, a valve in said channel, and means operated by the molds in succession to actuate said valve and supply air under pressure to the said motors for actuating the latter.

5. Apparatus for producing molded glass articles, comprising a container for a pool of molten glass, an endless conveyor extending along a horizontal closed path, means for continuously driving the conveyor and causing it to travel in said path, a series of gathering molds connected to the conveyor at uniformly spaced intervals and traveling with the conveyor, said molds positioned horizontally outward from the conveyor, and an endless supporting and guiding rail surrounding and spaced outwardly from the conveyor and providing a support for the molds during their travel with the conveyor.

6. Apparatus for producing glass articles, comprising a pair of vertical shafts spaced horizontally, gears on said shafts, a blank mold conveyor trained over said gears, blank molds carried by said conveyor, a horizontally disposed spindle conveyor, vertical spindles connected thereto, a second pair of vertical shafts, gears thereon and over which the spindle conveyor is trained, a finishing mold conveyor, finishing molds carried thereby, a third pair of horizontally spaced vertical shafts, gears thereon over which the finishing mold conveyor is trained, said spindle conveyor being in a horizontal plane at a lower level than the other said conveyors and extending horizontally beneath portions of said other conveyors, and means for continuously driving said conveyors in synchronism and causing each spindle to be brought beneath and travel in register with a blank mold a certain distance, and thereafter to be brought beneath and travel in register with a finishing mold during another portion of its travel.

7. Apparatus for producing glass articles, comprising a pair of vertical shafts spaced horizontally, gears on said shafts, a blank mold conveyor trained over said gears, blank molds carried by said conveyor, a horizontally disposed spindle conveyor, vertical spindles connected thereto, a second pair of vertical shafts, gears thereon and over which the spindle conveyor is trained, a finishing mold conveyor, finishing molds carried thereby, a third pair of horizontally spaced vertical shafts, gears thereon over which the finishing mold conveyor is trained, said spindle conveyor being in a horizontal plane at a lower level than the other said conveyors and extending horizontally beneath portions of said other conveyors, means for continuously driving said conveyors in synchronism and causing each spindle to be brought beneath and travel in register with a blank mold a certain distance, and thereafter to be brought beneath and travel in register with a finishing mold during another portion of its travel, means for introducing glass into the blank molds and forming blanks of glass in the blank molds, means for transferring the blanks to said spindles, means for enclosing the blanks in the finishing molds while supported on the spindles, and means to blow the blanks in the finishing molds.

8. In an apparatus for forming hollow glass articles, the combination of a blank mold conveyor arranged to travel in a horizontal closed path, blank molds thereon, a finishing mold conveyor mounted to travel in a horizontal closed path positioned horizontally beyond the blank mold conveyor, finishing molds carried by said finishing mold conveyor, a spindle conveyor positioned beneath the other said conveyors, spindles thereon, means for transferring blanks from the blank molds to said spindles, means for enclosing the blanks in the finishing molds while carried by the spindles, and means for blowing the blanks in the finishing molds.

9. In an apparatus for forming hollow glass articles, the combination of a blank mold conveyor arranged to travel in a horizontal closed path, blank molds thereon, a finishing mold conveyor mounted to travel in a horizontal closed path positioned horizontally beyond the blank mold conveyor, finishing molds carried by said finishing mold conveyor, a spindle conveyor positioned beneath the other said conveyors, spindles thereon, means for transferring blanks from the blank molds to said spindles, means for enclosing the blanks in the finishing molds while carried by the spindles, means for blowing the blanks in the finishing molds, while the blanks are attached to the spindles, and means for rotating the spindles and thereby rotating the blanks while in the finishing molds.

10. Apparatus for forming hollow glass articles, comprising a blank mold, means for introducing a charge of glass into the mold and forming an inverted blank, a spindle, means for positioning the spindle beneath the blank mold, means for dropping the inverted blank onto the spindle, a downwardly opening intermediate mold, means for positioning it over the spindle and enclosing the blank, means for blowing the blank in said intermediate mold while supported on the spindle, means for withdrawing the intermediate mold leaving the inverted blank on the spindle, a finishing mold open at its lower end, means for positioning the finishing mold over the spindle and introducing the inverted blank thereinto by a relative vertical movement of the finishing mold and spindle, and means for blowing the blank to finished form in the finishing mold.

11. Apparatus for forming hollow glass articles, comprising a blank mold, means for introducing a charge of glass into the mold and forming an inverted blank, a spindle, means for positioning the spindle beneath the blank mold, means for dropping the inverted blank onto the spindle, a downwardly opening intermediate mold, means for positioning it over the spindle and enclosing the blank, means for blowing the blank in said intermediate mold while supported on the spindle, means for withdrawing the intermediate mold leaving the inverted blank on the spindle, a finishing mold open at its lower end, means for positioning the finishing mold over the spindle and introducing the inverted blank thereinto by a relative vertical movement of the finishing mold and spindle, means for blowing the blank to finished form in the finishing mold, and means for rotating the spindle and thereby rotating the blank while the latter is in the intermediate mold and for further rotating the blank while in the finishing mold.

12. The combination of a vertical drive shaft, a vertical driven shaft spaced horizontally therefrom, gears on said shafts, an endless chain conveyor trained over said gears, means for rotating the drive shaft and thereby driving said conveyor, molds connected to said conveyor to travel therewith, a burner carriage mounted to rotate with one of said shafts and positioned beneath the path of the molds, burners on said carriage and brought beneath and in register with the molds during said rotation, means for blowing blanks in the molds, and means for lowering the blown blanks to the burners while the latter are in register with the molds and causing the burners to burn the moil from the blown articles.

13. The combination of a vertical drive shaft, a vertical driven shaft spaced horizontally therefrom, gears on said shafts, an endless chain conveyor trained over said gears, means for rotating the drive shaft and thereby driving said conveyor, molds connected to said conveyor to travel therewith, a burner carriage mounted to rotate with one of said shafts and positioned beneath the path of the molds, burners on said carriage and brought beneath and in register with the molds during said rotation, means for blowing blanks in the molds, and means for lowering the blown blanks to the burners while the latter are in register with the molds and causing the burners to burn the moil from the blown articles, said lowering means comprising a vertical shaft extending downward into the mold and a suction head thereon to engage the blown article and hold it by suction while the article is lowered.

14. The combination of a vertical drive shaft, a vertical driven shaft spaced horizontally therefrom, gears on said shafts, an endless chain conveyor trained over said gears, means for rotating the drive shaft and thereby driving said conveyor, molds connected to said conveyor to travel therewith, a burner carriage mounted to rotate with one of said shafts and positioned beneath the path of the molds, burners on said carriage and brought beneath and in register with the molds during said rotation, means for blowing blanks in the molds, means for lowering the blown blanks to the burners while the latter are in register with the molds and causing the burners to burn the moil from the blown articles, said lowering means comprising a vertical shaft extending downward into the mold and a suction head thereon to engage the blown article and hold it by suction while the article is lowered, and means for rotating said last mentioned shaft and the article carried thereby while the latter is in the burner.

15. A machine for forming hollow glass articles, comprising in combination a vertically disposed spindle, means cooperating therewith for holding a blank on the upper end of the spindle, a rock shaft, a rock arm thereon, an inverted mold on the rock arm, means for rocking said shaft and thereby swinging the inverted mold over the spindle, means for lowering the rock shaft and thereby moving the mold downward into position to enclose the blank, and means for blowing the blank in the mold.

16. A machine for forming hollow glass articles, comprising an endless chain carrier, a series of spindles on the carrier, means for driving the carrier and causing the spindles to travel in a closed path, molds individual to the spindles and connected to travel with the carrier, means independent of the molds for supplying bare blanks to the spindles, means cooperating with the spindles for attaching the blanks to the spindles, automatic means for moving the molds into position to enclose the blanks, and means for blowing the blanks in the molds.

17. In a machine for forming hollow glass articles, the combination of an endless chain carrier, a series of spindles thereon, means for driving said carrier, means for attaching blanks to the spindles, molds individual to the spindles and mounted to travel with the carrier, a stationary cam, and means cooperating therewith for shifting the empty molds relative to the carrier and while the blanks are supported on the spindles, into position to enclose the blanks, and means to expand the blanks in the molds.

18. A machine of the character described, comprising an endless carrier, means for driving the carrier, a series of mold units mounted on said carrier, each said unit including a supporting frame and a mold comprising sections slidably mounted on said frame for movement to and from a mold closing position, means for effecting said movements of the mold sections, a shaft extending into the mold at one end thereof, a chuck carried by said shaft, means for attaching the chuck to an article within the mold and holding said article during the opening of the mold, and means for rotating the chuck and thereby rotating the article held thereby.

19. A machine of the character described, comprising an endless carrier, means for driving the carrier, a series of mold units mounted on said carrier, each said unit including a supporting frame and a mold comprising sections slidably mounted on said frame for movement to and from a mold closing position, means for effecting said movements of the mold sections, a shaft extending into the mold at one end thereof, a chuck carried by said shaft, means for attaching the chuck to an article within the mold and holding said article during the opening of the mold, and means for moving said shaft lengthwise into and through the mold and thereby carrying the article out of the mold through the opposite end thereof.

RANDOLPH H. BARNARD.
FRANK T. NESBITT.
CARL W. SCHREIBER.
JOSEPH P. BENOIT.
JOHN E. McLAUGHLIN.